May 5, 1970  W. J. BIRD  3,510,088
VARIABLE-GEOMETRY AIRCRAFT
Filed Feb. 5, 1968  7 Sheets-Sheet 1
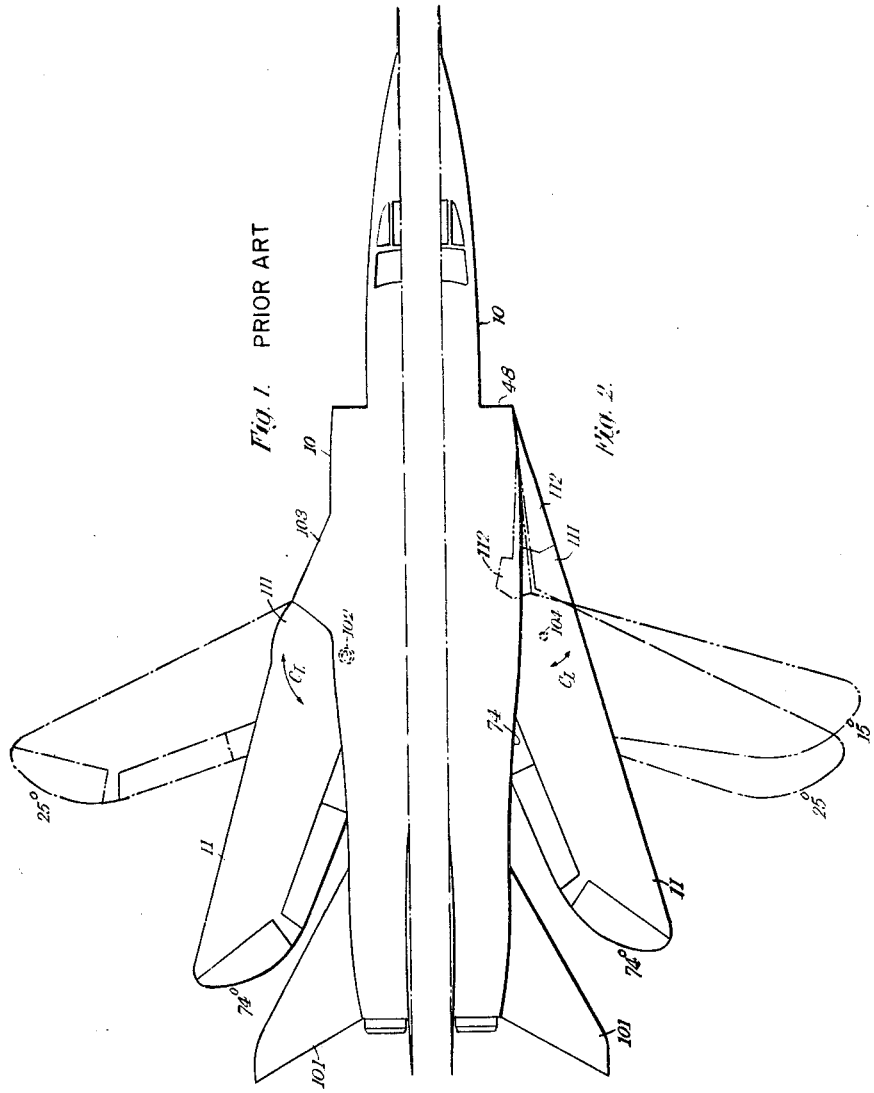
INVENTOR
WALTER JOHN BIRD

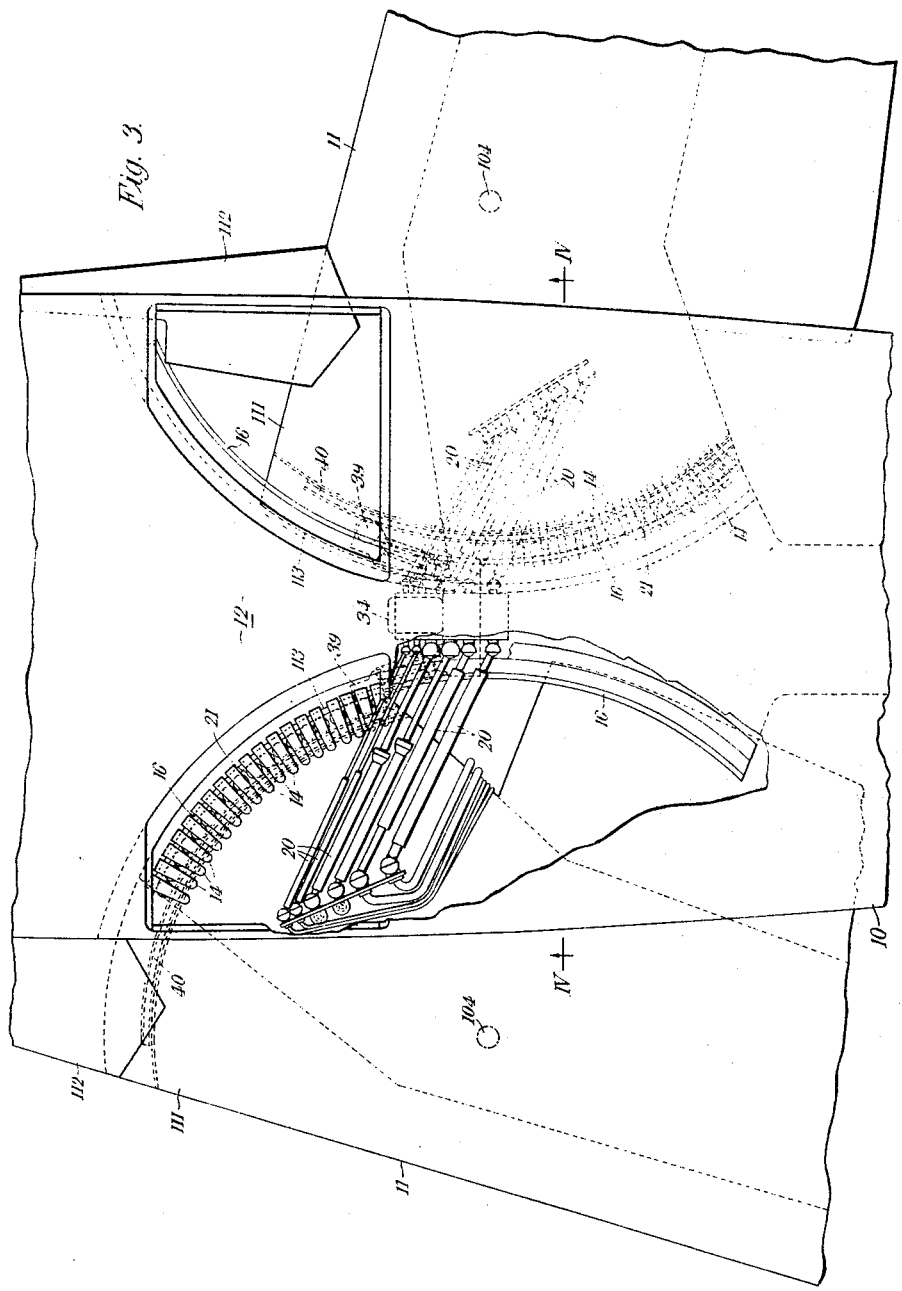

INVENTOR
WALTER JOHN BIRD

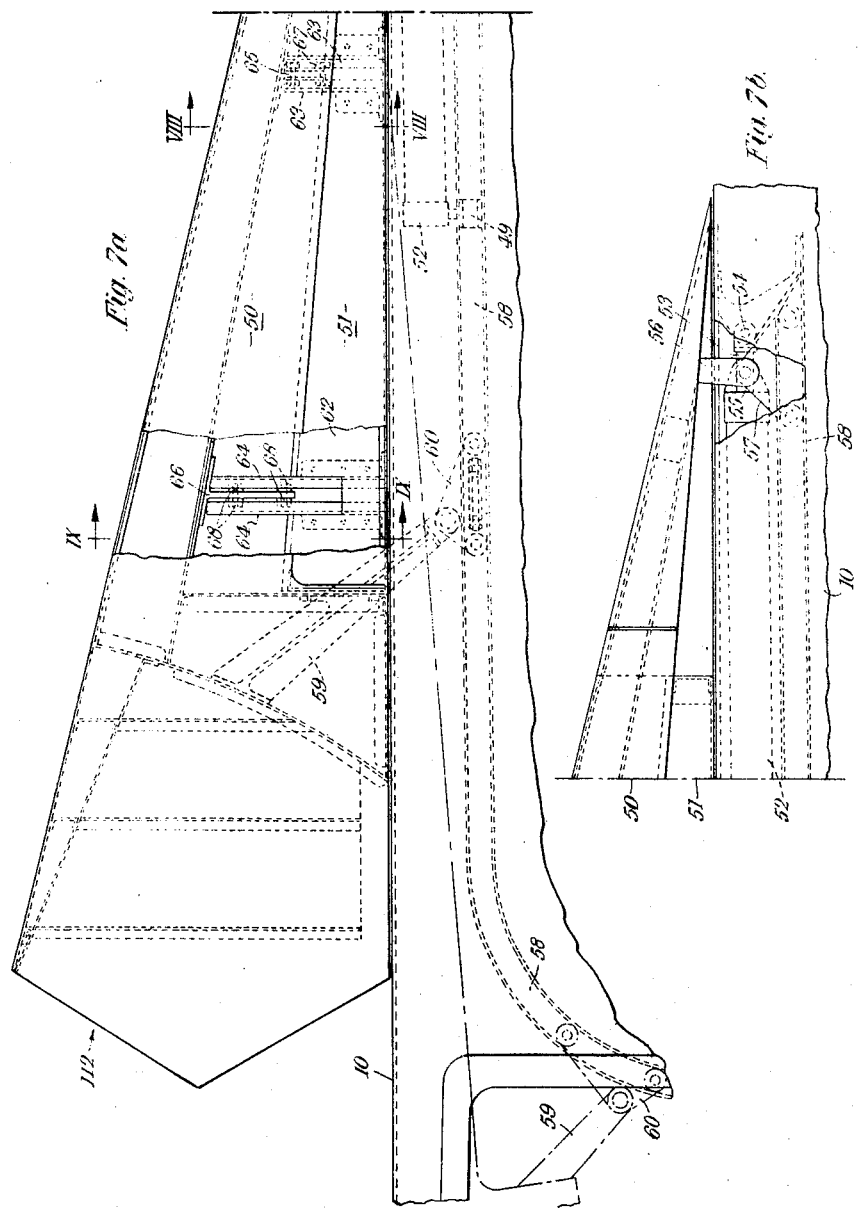

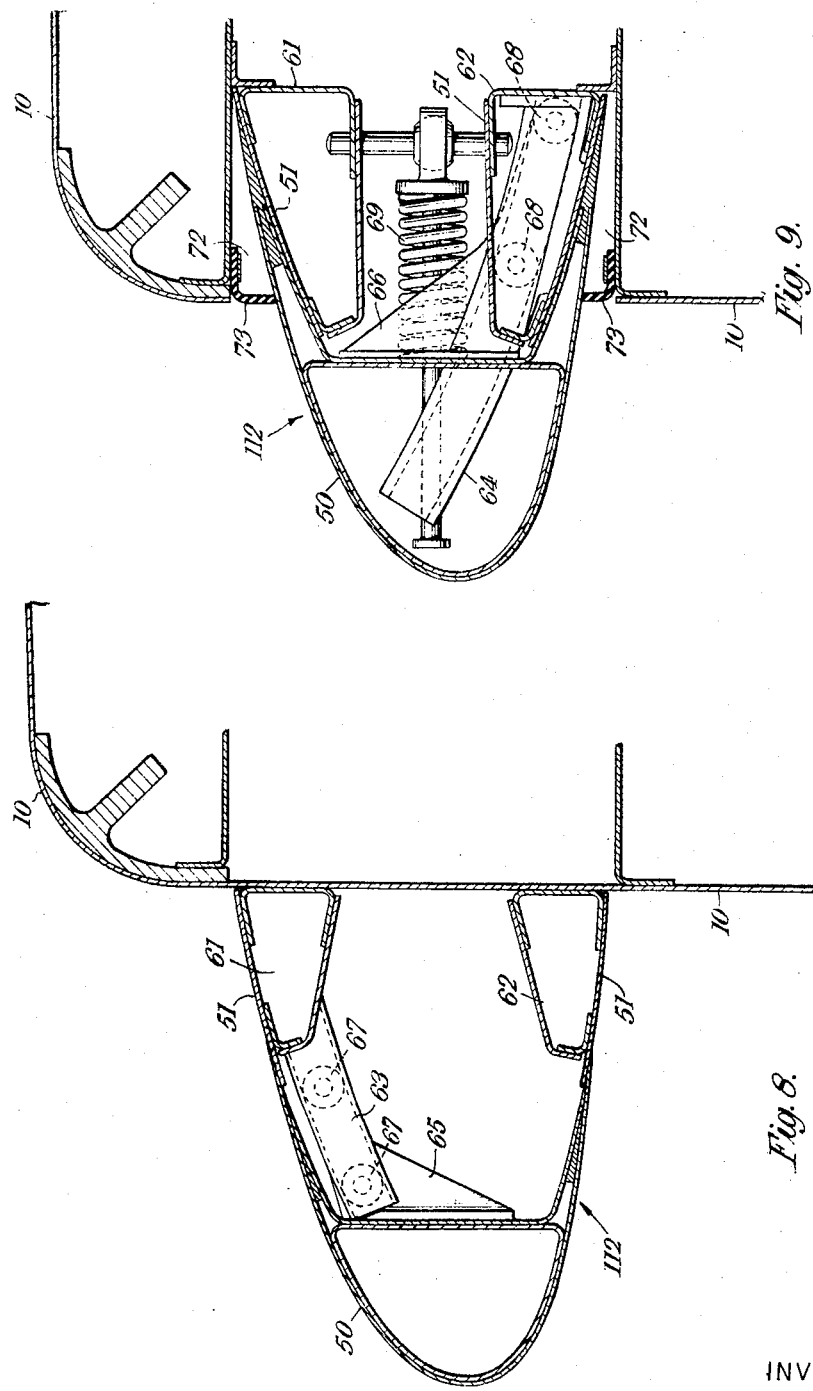

United States Patent Office 3,510,088
Patented May 5, 1970

3,510,088
VARIABLE-GEOMETRY AIRCRAFT
Walter John Bird, Feltham, England, assignor to British Aircraft Corporation Limited, London, England, a British company
Filed Feb. 5, 1968, Ser. No. 703,849
Claims priority, application Great Britain, Feb. 6, 1967, 5,619/67
Int. Cl. B64c 3/40, 3/54
U.S. Cl. 244—46                             10 Claims

ABSTRACT OF THE DISCLOSURE

A variable-geometry aircraft in which the load-transmitting connection between each wing and the fuselage is constituted by members on the wing root engaging an arcuate trackway in the fuselage, which is so disposed that the wing pivots about a point outboard of the fuselage and of any part fixed to it, and close to the center of lift, so that trim changes arising from wing sweep movements are minimized.

---

This invention relates to variable-geometry aircraft and more specifically to an aircraft having a fuselage and wings movable in relation thereto for varying the wing sweep angle.

A problem encountered with such aircraft is that variation of the wing sweep angle generally causes a shift in the position of the centre of lift of the wing, thus altering the longitudinal trim of the aircraft. It has been realised that this shift can be reduced by mounting the wing pivots as far from the fuselage centre line as is structurally practicable, but so long as the pivots are inside the fuselage the shift of the centre of lift and the consequential trim drag losses remain considerable. The use of lateral extensions of the fuselage to carry outboard wing pivots would cause additional drag losses. It has also been proposed that the wing pivots should be translated fore and aft as the wing sweep angle is altered, but this construction would involve considerable mechanical complication and occupy variable space. An object of the present invention is to provide a relatively compact construction in which the shift of the centre of lift and the drag losses are minimized.

According to the present invention, in a variable-geometry aircraft having a fuselage and wings movable in relation thereto to vary the wing sweep angle, each wing is connected to the fuselage for such movement by means of members secured to the wing root engaging an arcuate trackway disposed in the fuselage, the centre of curvature of the trackway being located outside the fuselage and any fixed appendage thereof and constituting a virtual wing pivot. Preferably the position of the centre of curvature of the trackway, i.e. the virtual wing pivot, is chosen so as to lie as close as may be structurally convenient to the centre of lift of the wing. It will be appreciated that the position of the centre of lift for each wing will vary for differing airspeeds and wing positions, so that the virtual wing pivot is preferably disposed at a mean position which will minimise trim changes due to movement of the centre of lift during the wing sweep operation and will be acceptable from the structural aspect.

Figure 4:
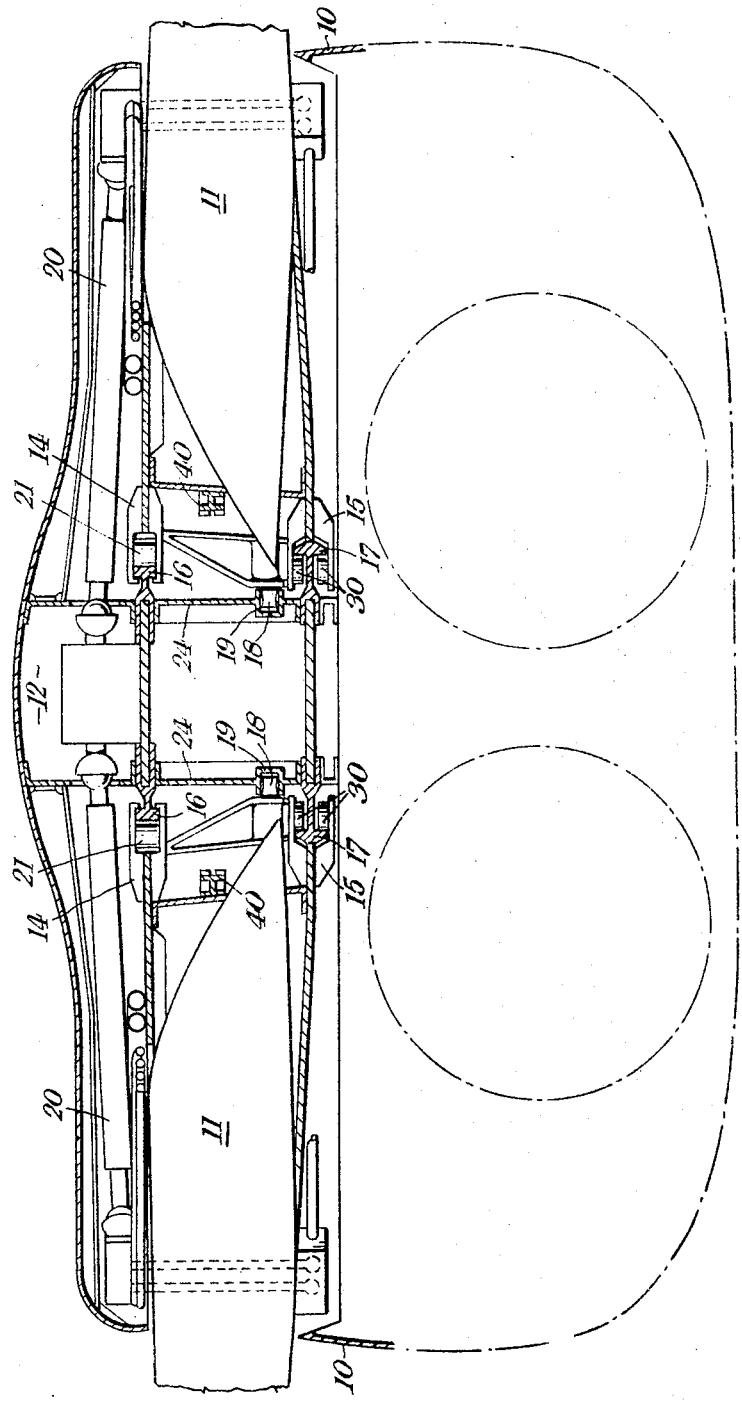
Figure 5:
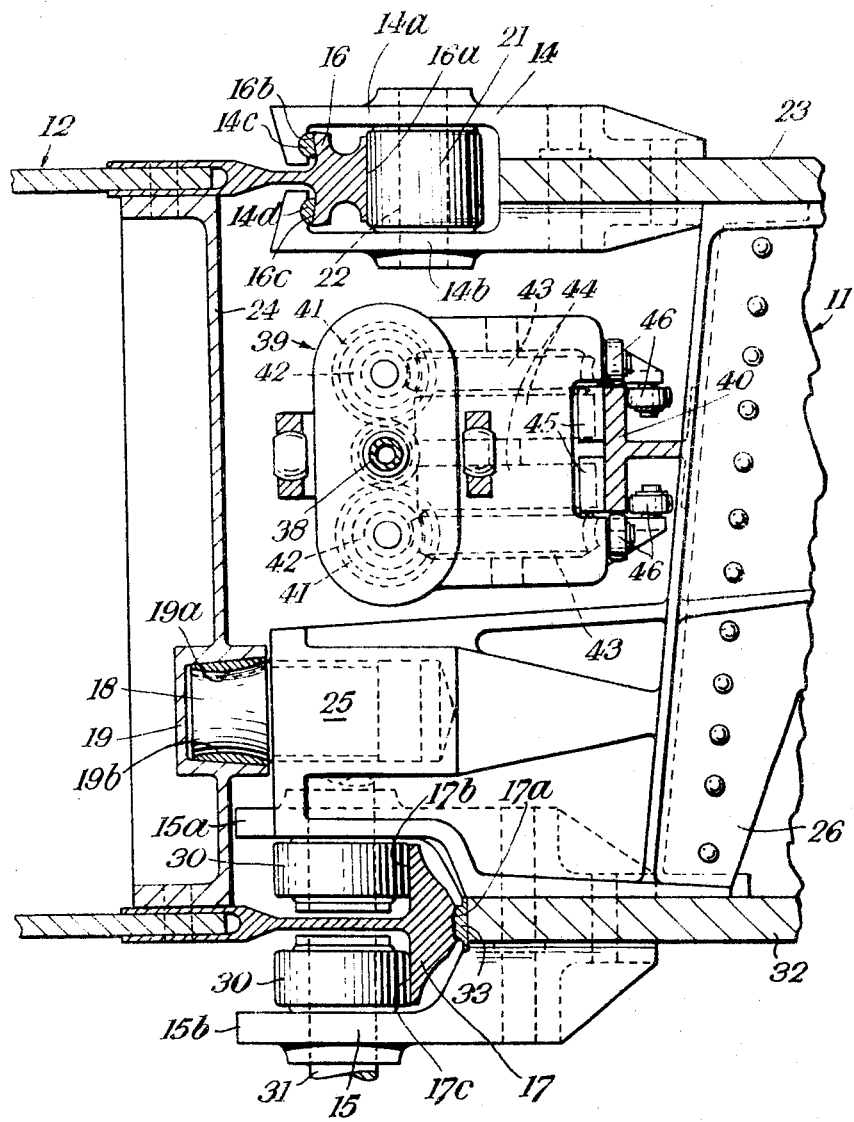
Figure 6:
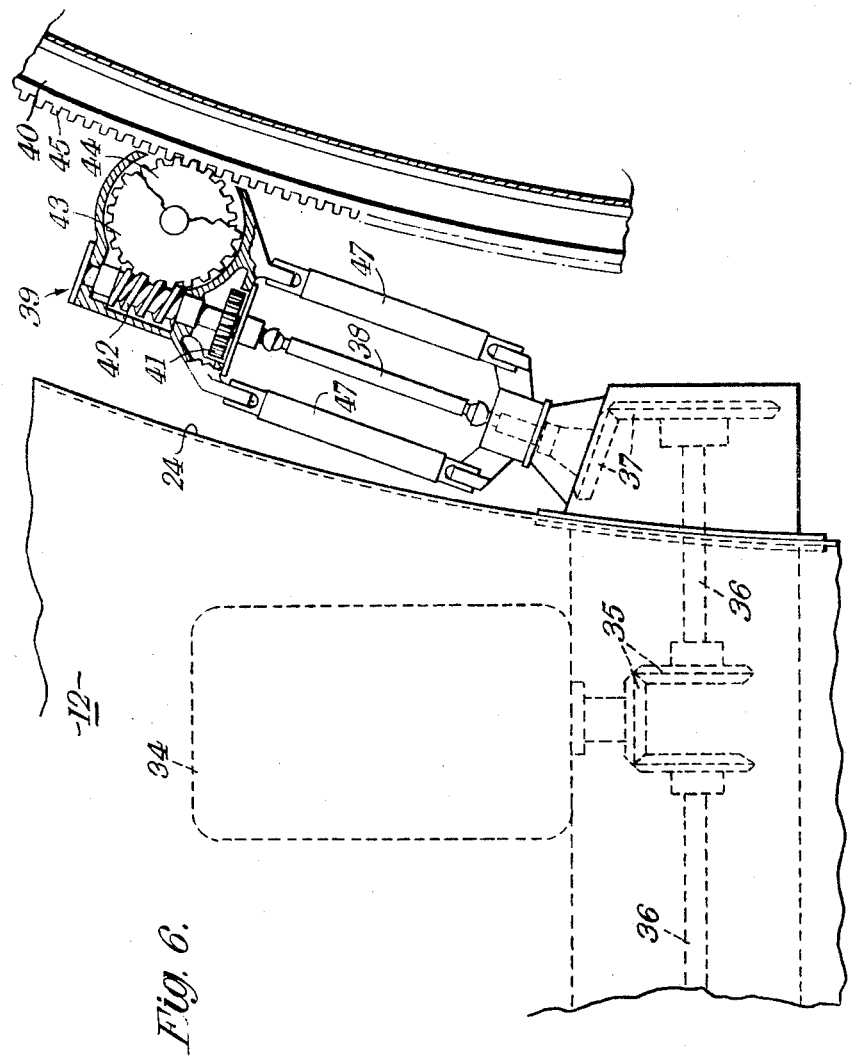

An embodiment of the invention, as applied to a relatively small supersonic aircraft, will now be described by way of example and with reference to the accompanying drawings in which:

FIG. 1 is a plan view showing one-half of an aircraft having wings adjustable in sweep about a conventional fixed pivot, FIG. 2 is a similar view showing one-half of the same aircraft modified to accord with the invention by the provision of wings adjustable in sweep about an outboard virtual wing pivot, FIG. 3 is a plan view of the centre section of the fuselage of the aircraft of FIG. 2, showing the port wing in the position of maximum sweep and the starboard wing in the position of minimum sweep (this situation would not occur in practice in which the sweep angles of both wing are always equal), FIG. 4 is a section on line IV—IV of FIG. 3, FIG. 5 is a section on an enlarged scale in a vertical plane through the joint between the wing and fuselage, showing the mechanism for varying the angle of wing sweep, FIG. 6 is a plan view of the said mechanism, with parts broken away for clarity, FIGS. 7a and 7b are plan views of a retractable fairing for the leading edge of the wing root, FIG. 8 is a section on the line VIII—VIII of FIG. 7a, and FIG. 9 is a section on the line IX—IX of FIG. 7a but showing the fairing retracted.

FIGS. 1 and 2 show for comparison an aircraft having a conventional fixed wing pivot and the same aircraft modified to have a virtual wing pivot in accordance with the present invention. In each case the aircraft has a fuselage 10, variable sweep wings 11 and a tail plane 101. In the case of FIG. 1, the wing 11 rotates about a fixed pivot 102 located in the fuselage 10, the leading edge of the wing root 111 cooperating with a fixed half-delta shaped fairing 103. The wing 11 is shown in full lines in the position of maximum sweep (74°) and in chain-dot lines in the position of minimum sweep (25°). Movement of the wing between these two positions produces a very considerable shift of the centre of lift, as indicated by the arrow $C_L$, causing a major change in the longitudinal trim of the aircraft.

In the case of FIG. 2, the wing 11 is mounted so as to rotate about a virtual pivot 104 outside the fuselage and any fixed appendage thereof. The leading edge of the wing root 111 in this case co-operates with a retractable fairing 112 which is drawn rearwardly and into the fuselage 10 as the wing 11 is swept forward from the position of maximum sweep (74°) shown in full lines to the position of minimum sweep. It can be seen that, as a result of the outboard mounting of the pivot 104, the longitudinal shift of the centre of lift between the 74° and 25° sweep positions of the wing is much reduced. In fact it is reduced to such an extent that a minimum sweep position of 15°, also shown in chain-dot lines, can be employed without shifting the centre of lift unacceptably far forward. Thus an improved landing and take-off performance can be achieved as well as reduction of trim drag at supersonic speeds. Further improved aerodynamic effects may be obtained as a result of the increased gap between wings 11 and tail plane 101 in the fully swept position, which can be seen by comparison of FIGS. 1 and 2.

FIG. 3 illustrates in plan the mountings for the wings 11 of the aircraft of FIG. 2, and FIG. 4 illustrates the mounting in transverse section. The root portion 111 of each wing 11 has an arcuate sector 113. The upper and lower edges of this sector 113 each carry a plurality of radially extending yoke members 14, 15 respectively, which engage upper and lower arcuate tracks 16, 17 mounted on the centre section 12 of the fuselage 10. Roller members 18 secured to the wing root run in a channel-shaped track 19 in the fuselage centre section. The three tracks 16, 17 and 19 together constitute the arcuate trackway supporting the wing for movement between its positions of minimum and maximum sweep. Further details of the mounting will be described below in connection with FIG. 5. Mechanical, fluid and electrical services to the wings from the fuselage are taken through telescopic connections 20 having pivot joints at both ends. Comparison of the two sides of FIG. 3 will show the range of movement of the wing root and the manner in which the connections 20 accommodate themselves to this movement.

FIG. 5 shows the wing mounting and trackway to a larger scale on a section through the joint near the leading edge of the wing root.

The upper connection, i.e. that between yokes 14 and track 16, in most flight conditions is subjected to compressive loads due to the wing bending movement, but in static conditions is subjected to a tensile load due to the static weight of the wing. The upper track 16 is of double-headed T section, surfaces 16a, 16b and 16c forming the bearing surfaces. Cooperating with surface 16a to provide the path for the compressive loads are a series of rollers 21 located on shafts 22 mounted between the fork ends 14a and 14b of the yoke members 14 attached to the upper skin 23 of the wing 11. The fork ends 14a and 14b extend around the T section and are provided with pads 14c, 14d co-operating with surfaces 16b and 16c to provide a plain bearing for the tensile load path.

The intermediate track 19 provides a path for the shear and torsional loads from the wing 11 to the fuselage 10. The track 19 consists of a channel section, mounted on the side panel 24 of the fuselage centre section structure 12 and having arcuate-section bearing surfaces 19a and 19b on its opposed inner faces. These bearing surfaces are engaged by a pair of rollers 18 each of which is mounted in a respective boss 25 projecting inwards from the wing root structure 26, the two bosses 25 being provided in the region of the front and rear spar members (not shown) of the wing 11. Further rollers 18 may be provided if desired.

In the lower connection between the wing and fuselage, the track 17 is again of T section, but is adapted to withstand the tensile loads to which it is subjected in normal flight conditions and also the compressive loads due to static conditions.

Bearing surfaces 17a, 17b and 17c provide the load paths to the fuselage. Rollers 30, mounted on shafts 31 in forks 15a and 15b of the yoke member 15 attached to the lower skin 32 of the wing, provide the paths for the tensile loads, co-operating with surfaces 17b and 17c on the track 17. The path for the static compressive load is provided by a bearing pad 33 secured in yoke 15 and co-operating as a plain bearing with surface 17a on the track 17.

Wing sweep movement is actuated by duplicated hydraulic motors 34 (FIGS. 3 and 6), mounted within the fuselage centre section structure 12, which are connected through a common high reduction gearing 35 and a series of shafts and reduction gears to driving heads 39 co-operating with a toothed rack 40 on each wing root. The drive to each wing is identical and consists of a transverse shaft 36 driving, via bevel gears 37, a universally jointed shaft 38. The shaft 38 drives through spur gears 41 a pair of worms 42 meshing with worm wheels 43 carrying on their sides pinions 44 engaging respectively the two sets of teeth 45 on the rack 40. The pinions 44 of the driving head 39 are held in mesh with the rack 40 by a series of rollers 46 (not shown in FIG. 6) mounted on the driving head 39, which engage with opposing top, bottom and rear faces of the rack 40.

The driving head 39 is secured to the fixed centre section structure 12 but capable of movement in two planes with respect to it so as to accommodate wing deflections due to flight and static loads, by means of a parallelogram structure formed of at least two rods 47 (FIG. 6) pivotally mounted at each end.

It can be seen from FIG. 2 that, in the fully swept position of the wing 11, the fairing 112 continues the line of the leading edge of the wing forward to a point on the fuselage near the engine air intake 48. As the wing 11 is swept forward, the leading edge of the wing root moves aft. To avoid discontinuities and to leave the maximum extent of the wing unobstructed, it is necessary that the fairing 112 should simultaneously move aft and be retracted into the fuselage to the position shown in chain-dot lines in FIG. 2. The manner in which this is done is illustrated in more detail in FIGS. 7a and 7b, 8 and 9.

As can be seen from FIGS. 7a and 7b, the fairing 112 is in two parts, an outer part 50 and an inner part 51 capable of movement into the outer part 50. The aft movement and retraction of the fairing 112 is effected by a hydraulic operating jack 52 whose piston rod 53 is connected to a fixed part of the fuselage structure at 54. Actuation of the jack 52 is controlled by micro-switches (not shown) sensitive to wing sweep movements. The cylinder of the jack 52 is connected at 55 to a lug 56 on the outer part 50 of the fairing 112 and to a carriage 57 which runs in guide rails 58. The rear end of the jack cylinder has a steady mounting 49 sliding in the guide rails 58. The outer part 50 of the fairing 112 is also connected by an arm 59 to a second carriage 60 also running in the rails 58. The rails 58 are straight for the greater part of their length but are curved towards the inside of the fuselage at their rear ends. The inner part 51 of the fairing 112 comprises a pair of longitudinal ribs 61 and 62 each of which carries an outwardly extending curved rail 63, 64 respectively. The outer part 50 carries inwardly extending brackets 65, 66 on which are mounted pairs of rollers 67, 68 running in the rails 63, 64 respectively. The inner and outer parts 50 and 51 are urged apart by a spring member 69. On extension of the jack 52 from the position shown in FIGS. 7a and 7b, the fairing 112 is moved bodily aft, being guided by the carriages 57 and 60 running in the rails 58. As the carriage 60 reaches the bend in the rails 58, the after end of the fairing 112 is drawn into the fuselage 10. At this stage the ribs 61, 62 abut against the outer surface of the fuselage so that the initial retractive movement is carried out by the outer part 50 alone. As the outer part 50 is retracted, the rollers 67 and 68 running in the rails 63 and 64 cause the ribs 61 and 62 to move towards one another until the inner part 51 of the fairing 112 can also retract into the slot 72 in the side of the fuselage. Rubber seals 73 are provided to close gaps that might otherwise be left between the retracted fairing 112 and the sides of the slot 72, and the forward part of the slot 72 which is left vacant by the aft movement of the fairing 112.

The slot which has to be provided in the fuselage side aft of the wing 11 at 74 (FIG. 2) may be closed in the forward position of the wing by means of sliding doors, e.g. as described and claimed in our British patent specification No. 1,086,151.

Although the invention has been more particularly described in connection with a supersonic aircraft, it also provides similar advantages if applied to aircraft capable of high subsonic speeds. Such aircraft do not require such large angles of wing sweep-back in the high speed configuration.

What I claim as my invention and desire to secure by Letters Patent is:

1. A variable geometry aircraft having a fuselage and provided with wings pivotally connected to said fuselage in such a manner to vary the wing sweep angle and wherein flight and static loads are transmitted between said wings and fuselage comprising; a load-transmitting connection between each wing and said fuselage constituted of members on the wing root, an arcuate trackway mounted on said fuselage, said members being guided in said trackway, the latter being positioned so that its center of curvature about which said wing pivots is located outside of said fuselage and remote from any part secured to said fuselage, said wing root members and said arcuate trackway forming the sole load transmitting connection between said wing and said fuselage.

2. An aircraft according to claim 1, wherein power means for effecting pivotal wing sweep movement comprises a pair of driving heads having rollers, a motor driving said pair of driving heads, each of the latter being mounted on the fixed structure of the aircraft by means allowing for wing deflection movements and includes a toothed rack, a pinion held in mesh with said toothed rack on the wing root by means of said rollers on the driving head engaging surfaces on the rack.

3. An aircraft according to claim 1, wherein a movable fairing is provided forward of each wing and co-operating with the leading edge of the root of the respective wing, each said fairing comprising an inner part adjacent the side of the fuselage and an outer part outboard of the inner part, said inner part being capable of being compressed and moved into the interior of said outer part, and means being provided for moving the outer part rearwardly and inwardly into the fuselage over the inner part as the wing root moves aft during reduction of the wing sweep angle.

4. An aircraft according to claim 1, wherein the centre of curvature of the trackway lies close to the mean position of the centre of lift of the wing.

5. An aircraft according to claim 1, wherein a movable fairing is provided forward of each wing, co-operating with the leading edge of the root of the respective wing.

6. An aircraft according to claim 1, wherein the members secured to the wing root comprise a plurality of radially extending yoke members disposed in two vertically spaced rows about the upper and lower edges of an arcuate sector of the wing root and engaging respective upper and lower tracks forming part of the arcuate trackway in the fuselage.

7. An aircraft according to claim 6, wherein the yoke members engage the tracks through rollers for taking the compressive loads during flight and through plain bearings for taking the static compressive loads when the aircraft is on the ground.

8. An aircraft according to claim 6, wherein the arcuate trackway also incorporates a horizontal channel-section track engaged by spaced rollers mounted on the wing root for taking the shear and torsional loads.

9. An aircraft according to claim 8, wherein the rollers are disposed in the region of front and rear spar members of the wing.

10. An aircraft according to claim 8, wherein the upper and lower bearing surfaces of the channel-section track are arcuate in cross-section and the rollers are correspondingly shaped in longitudinal section.

References Cited

UNITED STATES PATENTS

| | | | |
|---|---|---|---|
| 1,674,177 | 6/1928 | Nyakas | 244—46 |
| 2,074,897 | 3/1937 | Everts | 244—46 |
| 2,822,995 | 2/1958 | Bowen | 244—46 X |
| 2,961,196 | 11/1960 | Atkinson | 244—46 |
| 3,292,881 | 12/1966 | Ricard | 244—46 |

MILTON BUCHLER, Primary Examiner

J. L. FORMAN, Assistant Examiner

U.S. Cl. X.R.

244—43; 308—35